United States Patent
Keevert

(10) Patent No.: US 9,546,029 B1
(45) Date of Patent: Jan. 17, 2017

(54) PIPE THREAD PROTECTOR

(71) Applicant: Karl Keevert, Elk City, OK (US)

(72) Inventor: Karl Keevert, Elk City, OK (US)

( * ) Notice: Subject to any disclaimer, the term of this patent is extended or adjusted under 35 U.S.C. 154(b) by 0 days.

(21) Appl. No.: 14/930,770

(22) Filed: Nov. 3, 2015

(51) Int. Cl.
*F16L 55/10* (2006.01)
*B65D 59/06* (2006.01)
*F16B 2/22* (2006.01)

(52) U.S. Cl.
CPC ............ *B65D 59/06* (2013.01); *F16B 2/22* (2013.01)

(58) Field of Classification Search
USPC .......................... 138/89, 96 T, 96 R
See application file for complete search history.

(56) References Cited

U.S. PATENT DOCUMENTS

| | | | | |
|---|---|---|---|---|
| 1,749,162 A * | 3/1930 | Scott | ............... | B65D 59/00 138/96 T |
| 2,092,535 A * | 9/1937 | Schnorr | ............... | B65D 59/02 138/96 T |
| 2,416,829 A * | 3/1947 | Hartley | ............... | F16L 55/1152 138/89 |
| 2,709,830 A * | 6/1955 | Becker | ............... | A47B 91/04 138/89 |
| 3,056,427 A | 10/1962 | Higgins | | |
| 3,820,682 A * | 6/1974 | Davella | ............... | G02B 23/16 138/89 |
| 4,487,228 A | 12/1984 | Waldo | | |
| D281,350 S | 11/1985 | Heier | | |
| 5,048,571 A * | 9/1991 | Ellis | ............... | B65D 59/06 138/110 |
| 5,195,562 A | 3/1993 | Dreyfuss | | |
| 5,628,601 A * | 5/1997 | Pope | ............... | F01M 11/0408 138/89 |
| 5,803,126 A * | 9/1998 | Zaro | ............... | F16L 57/005 138/89 |
| 6,196,270 B1 | 3/2001 | Richards | | |
| 6,223,776 B1 * | 5/2001 | Glassell | ............... | F16L 55/10 138/89 |
| 6,349,745 B1 * | 2/2002 | Matsumoto | ............... | F16L 55/11 138/89 |
| 6,532,992 B1 * | 3/2003 | Holden | ............... | F16L 57/005 138/89 |
| 7,857,007 B2 | 12/2010 | Kovacs, Jr. | | |
| 8,752,454 B2 | 6/2014 | Friend | | |
| 2007/0113910 A1 | 5/2007 | Pagura | | |
| 2012/0261024 A1 * | 10/2012 | Ketzer | ............... | F16L 57/005 138/96 R |

(Continued)

FOREIGN PATENT DOCUMENTS

CN  101045493 A  10/2007

*Primary Examiner* — James Hook

(57) ABSTRACT

The pipe thread protector is a capped pipe that is adapted for use with a pipe and is designed to protect the interior screw threading and the exterior screw threading formed on the end of a pipe. The capped pipe is placed over the end of the pipe. The capped pipe is held in position with a plurality of cantilever springs that extend from the center of the capped pipe and that fit into the center space of the pipe to be protected. Once the plurality of cantilever springs are placed in the center space of the pipe to be protected, the plurality of cantilever springs press against the side of the pipe to hold the pipe thread protector in position. The pipe thread protector comprises an interior thread protector and an exterior thread protector.

3 Claims, 3 Drawing Sheets

(56) References Cited

U.S. PATENT DOCUMENTS

2013/0213516 A1* 8/2013 Clem ................... F16L 57/005
                                                           138/96 T
2015/0034197 A1* 2/2015 Schneider ........... F16L 55/1141
                                                           138/89

* cited by examiner

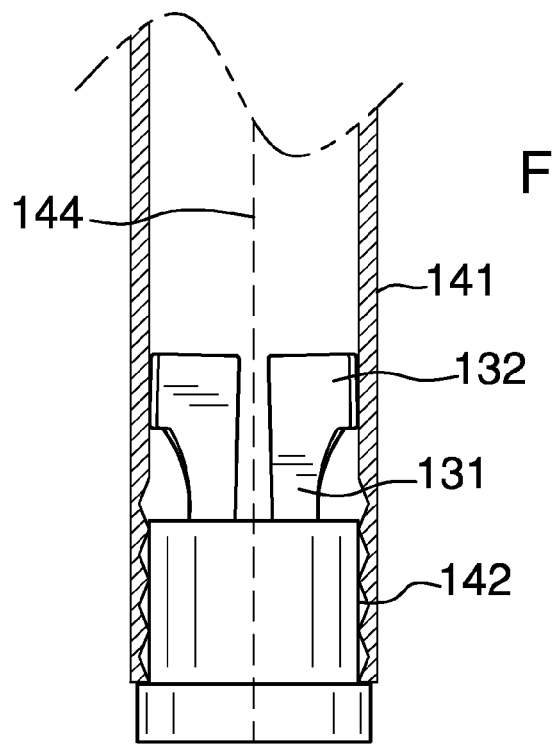
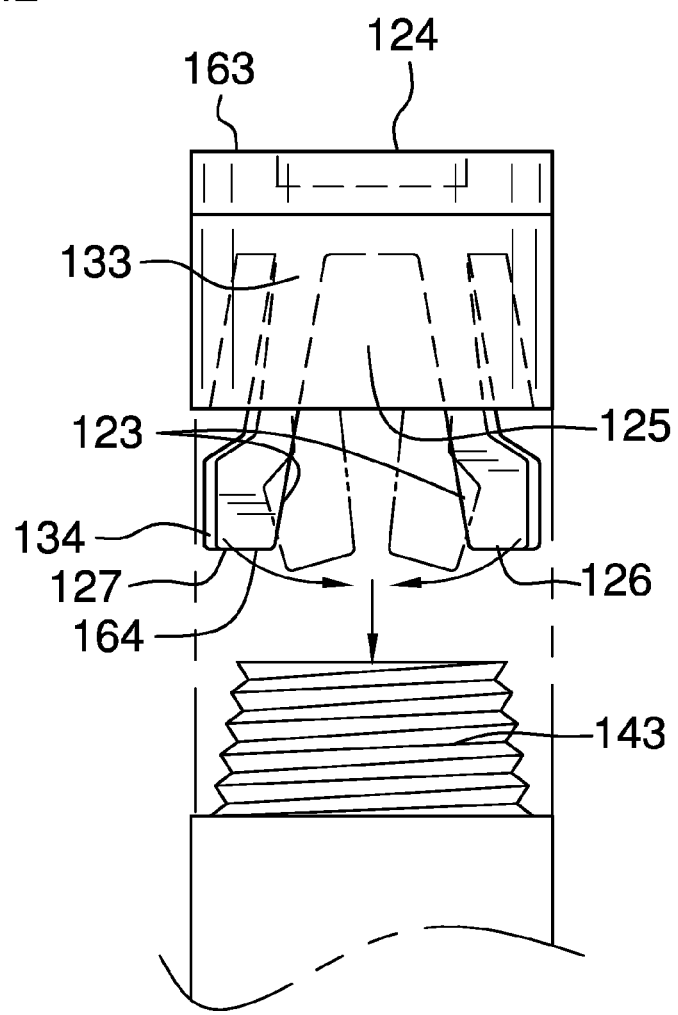

US 9,546,029 B1

PIPE THREAD PROTECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of closures and plugs for pipes, more specifically, an end cap adapted for use with threaded pipes.

SUMMARY OF INVENTION

The pipe thread protector is a capped pipe that is adapted for use with a pipe and is designed to protect the interior screw threading and the exterior screw threading formed on the end of a pipe. The capped pipe is placed over the end of the pipe. The capped pipe is held in position with a plurality of cantilever springs that extend from the center of the capped pipe and that fit into the center space of the pipe to be protected. Once the plurality of cantilever springs are placed in the center space of the pipe to be protected, the plurality of cantilever springs press against the side of the pipe to hold the pipe thread protector in position.

These together with additional objects, features and advantages of the pipe thread protector will be readily apparent to those of ordinary skill in the art upon reading the following detailed description of the presently preferred, but nonetheless illustrative, embodiments when taken in conjunction with the accompanying drawings.

In this respect, before explaining the current embodiments of the pipe thread protector in detail, it is to be understood that the pipe thread protector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pipe thread protector.

It is therefore important that the claims be regarded as including such equivalent construction insofar as they do not depart from the spirit and scope of the pipe thread protector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is an in use view of an embodiment of the disclosure.

FIG. 6 is an in use of an alternative embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
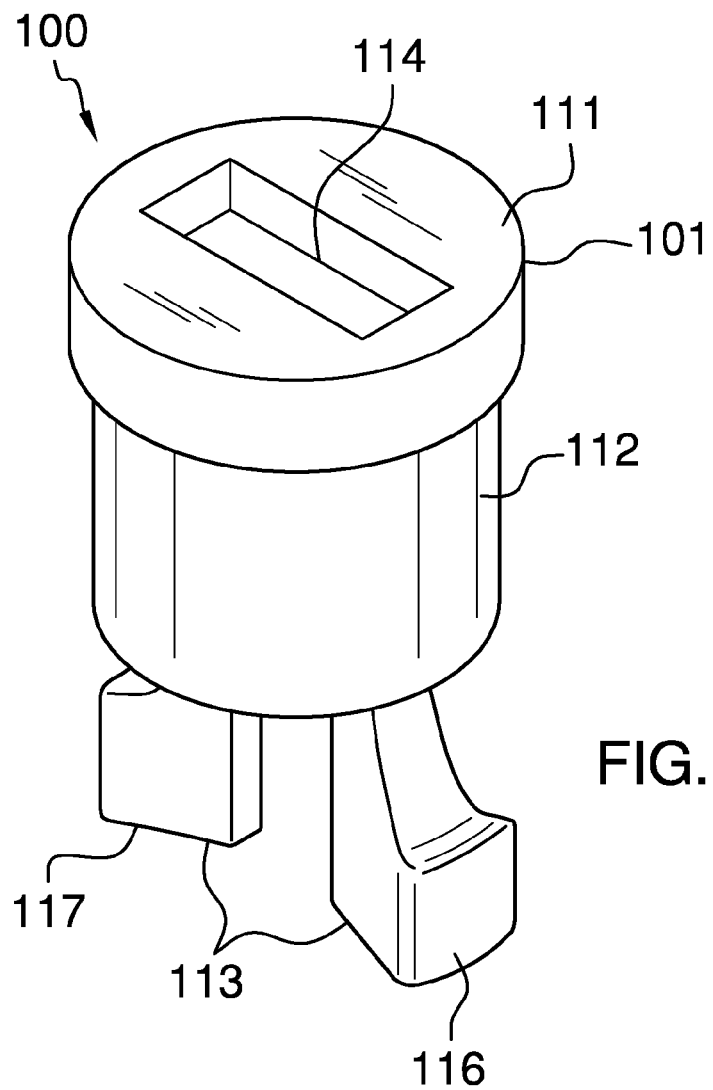
FIG. 1 is a perspective view of an embodiment of the disclosure.
Figure 2:
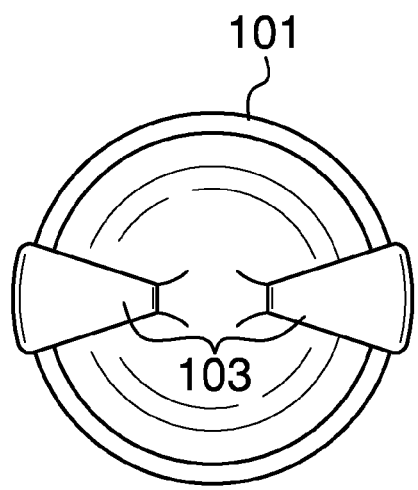
FIG. 2 is a bottom view of an embodiment of the disclosure.
Figure 3:
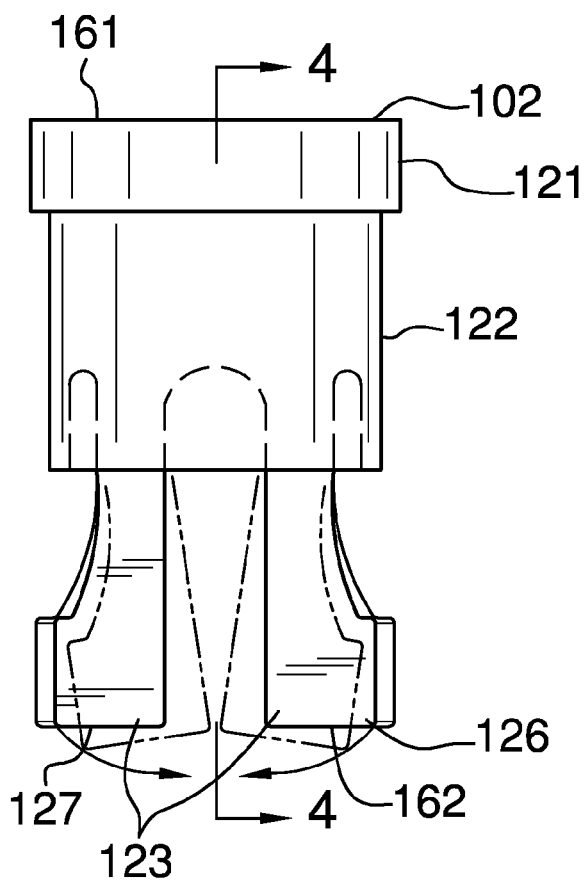
FIG. 3 is a front view of an embodiment of the disclosure.
Figure 4:
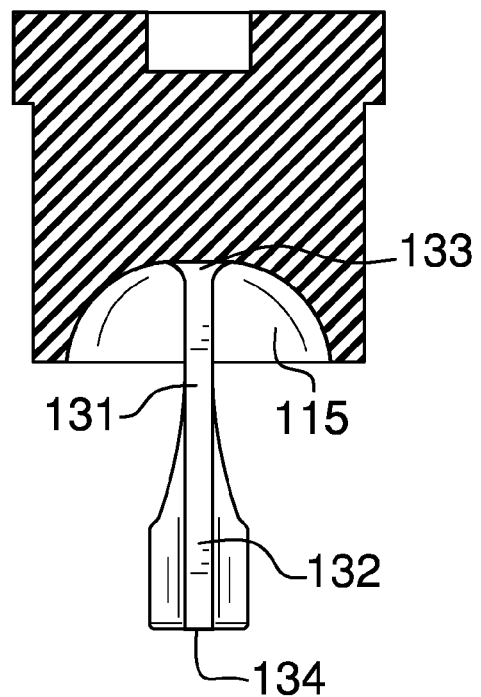
FIG. 4 is a cross-sectional view of an embodiment of the disclosure across 4-4.

Detailed reference will now be made to a first potential embodiment of the disclosure, which is illustrated in FIGS. 1 through 6. The pipe thread protector 100 (hereinafter invention) comprises an interior thread protector 101 and an exterior thread protector 102. Both the interior thread protector 101 and the exterior thread protector 102 are adapted for use with pipes 141 that have interior screw threads 142 or exterior screw threads 143 formed on them.

The interior thread protector 101 is adapted to protect an interior screw thread 142 formed on the end of a pipe 141. The interior thread protector 101 further comprises a first end cap 111, a plug 112, a first plurality of cantilever springs 113, and a first pull notch 114. The interior thread protector 101 is further defined with a first end 161 and a second end 162. The first end cap 111 is a solid disk that is located at the first end 161 of the interior thread protector 101. As shown in FIG. 5, the outer diameter of the first end cap 111 is sized to match the outer diameter of the pipe 141 into which the interior thread protector 101 is being inserted.

The first end cap 111 has formed in it a first pull notch 114. The first pull notch 114 is a hole that is formed in the first end cap 111. The first pull notch 114 allows the user to insert a finger into the first pull notch 114 so that the user can get a grip on the first pull notch 114 and remove the interior thread protector 101 from the pipe 141. Attached to the end of the first end cap 111 that is distal from the first end 161 of the interior thread protector 101 is the plug 112. The plug 112 is a cylindrical structure. The outer diameter of the plug 112 is sized to fit within the inner diameter of the pipe 141. The plug 112 is formed with a first hollow interior 115. The purpose of the first hollow interior 115 is to increase the length of each of the first plurality of cantilever springs 113, which increases the leverage and holding force of each of the first plurality of cantilever springs 113.

Each of the first plurality of cantilever springs 113 is effectively a bar that is attached to the surface of the hollow interior 115 of the plug 112 and projects away from the first end 161 of the interior thread protector 101 parallel to the center axis 144 of the plug 112 past the end of the plug 112 that is distal to the second end 162 of the interior thread protector 101. Each spring selected from the first plurality of cantilever springs 113 further comprises a spring lever 131 and a spring foot 132. The spring lever 131 is further defined with a fixed end 133 and a free end 134. The fixed end 133 of the spring lever 131 is attached to the surface of first hollow interior 115 of the plug 112. The free end 134 is distal from the fixed end 133.

The spring foot 132 is mounted on the free end 134 of the spring lever 131. The spring foot 132 is a structure that projects perpendicularly away from the spring lever 131 in the direction away from the center axis 144 of the plug 112. The spring foot 132 is sized such that when the interior thread protector 101 is inserted into the pipe 141, the spring foot 132 presses against the interior surface on the pipe 141, which pushes the spring lever 131 toward the center axis 144 of the plug 112. The elasticity of the spring lever 131 resists the displacement caused by the spring foot 132, which creates an opposing force that holds the interior thread protector 101 in position.

Ideally, the center axis 144 of the plug 112 is aligned with the center axis 144 of the pipe 141.

The exterior thread protector 102 is adapted to protect an exterior screw thread 143 formed on the end of a pipe 141. The exterior thread protector 102 further comprises a second end cap 121, a barrel 122, a second plurality of cantilever springs 123, and a second pull notch 124. The exterior thread protector 102 is further defined with a third end 163 and a fourth end 164. The second end cap 121 is a solid disk that is located at the third end 163 of the exterior thread protector 102. As shown in FIG. 6, the outer diameter of the second end cap 121 is sized to match the outer diameter of the barrel 122. The second end cap 121 has formed in it a second pull notch 124. The second pull notch 124 is a hole that is formed in the second end cap 121. The second pull notch 124 allows the user to insert a finger into the second pull notch 124 so that the user can get a grip on the second pull notch 124 and remove the exterior thread protector 102 from the pipe 141.

Attached to the end of the second end cap 121 that is distal from the third end 163 of the exterior thread protector 102 is the barrel 122. The barrel 122 is a cylindrical structure. The barrel 122 is formed with a second hollow interior 125. The inner diameter of the barrel 122 is sized to fit over the outer diameter of the pipe 141. The purpose of the second hollow interior 125 is to increase the length of each of the second plurality of cantilever springs 123, which increases the leverage and holding force of each of the second plurality of cantilever springs 123.

Each of the second plurality of cantilever springs 123 is effectively a bar that is attached to the surface of the hollow interior 125 of the barrel 122 and projects away from the third end 163 of the exterior thread protector 102 parallel to the center axis 144 of the barrel 122 past the end of the barrel 122 that is distal to the fourth end 164 of the exterior thread protector 102. Each spring selected from the second plurality of cantilever springs 123 further comprises a spring lever 131 and a spring foot 132. The spring lever 131 is further defined with a fixed end 133 and a free end 134. The fixed end 133 of the spring lever 131 is attached to the surface of the second hollow interior 125 of the barrel 122. The free end 134 is distal from the fixed end 133. The spring foot 132 is mounted on the free end 134 of the spring lever 131. The spring foot 132 is a structure that projects perpendicularly away from the spring lever 131 in the direction away from the center axis 144 of the barrel 122. The spring foot 132 is sized such that when the exterior thread protector 102 is inserted into the pipe 141, the spring foot 132 presses against the interior surface on the pipe 141, which pushes the spring lever 131 toward the center axis 144 of the barrel 122. The elasticity of the spring lever 131 resists the displacement caused by the spring foot 132, which creates an opposing force that holds the exterior thread protector 102 in position.

Ideally, the center axis 144 of the barrel 122 is aligned with the center axis 144 of the pipe 141.

In a second potential embodiment of the disclosure, as shown in FIGS. 7 and 8, the exterior thread protector 102 can be used to protect either an exterior screw thread 143 or an interior screw thread 142. In the second potential embodiment of the disclosure, the exterior thread protector 102 is selected such that the inner diameter of the barrel 122 will fit over the outer diameter of the pipe 141. The exterior screw thread 143 is inserted into the pipe 141 in the same manner as the interior thread protector 101 of first potential embodiment of the disclosure is inserted into the pipe 141. Using the exterior thread protector 102 in this manner will protect the interior screw thread 142 of a pipe 141 from damage from external forces including weather damage and storm damage from flying objects.

In the first potential embodiment of the disclosure, the first plurality of cantilever springs 113 comprises a first spring 116 and a second spring 117.

To use the interior thread protector 101, pressure is applied to the first spring 116 and the second spring 117 to push the first spring 116 and the second spring 117 towards the center axis 144 of the plug 112. The free end 134 of the first spring 116 and the free end 134 of the second spring 117 are inserted into the pipe 141 to be protected. After the spring foot 132 of the first spring 116 and the spring foot 132 of the second spring 117 are clear of the interior screw thread 142, the pressure on the first spring 116 and the second spring 117 can be released. The interior thread protector 101 is then inserted into the pipe 141 until the first end cap 111 abuts the pipe 141.

In the first potential embodiment of the disclosure, the second plurality of cantilever springs 123 comprises a third spring 126 and a fourth spring 127.

To use the exterior thread protector 102, the free end 134 of the third spring 126 and the free end 134 of the fourth spring 127 are inserted into the pipe 141 to be protected. The exterior thread protector 102 is then inserted into the pipe 141 until the second end cap 121 abuts the pipe 141.

The interior thread protector 101 and the exterior thread protector 102 are each formed as a single unit from molded plastic. Suitable plastics include, but are not limited to, polyethylene or polyvinylchloride.

The following definitions were used in this disclosure:

Capped Pipe: As used in this disclosure, a capped pipe is a pipe with one closed end and one open end.

Exterior Screw Thread: An exterior screw thread is a ridge wrapped around the outer surface of a tube in the form of a helical structure that is used to convert rotational movement into linear movement.

Inner Diameter: As used in this disclosure, the term inner diameter is used in the same way that a plumber would refer to the inner diameter of a pipe.

Interior Screw Thread: An interior screw thread is a ridge wrapped around the inner surface of a tube in the form of a helical structure that is used to convert rotational movement into linear movement Outer Diameter: As used in this disclosure, the term outer diameter is used in the same way that a plumber would refer to the inner diameter of a pipe.

Pipe: As used in this disclosure, a pipe is a hollow cylindrical device that is used for transporting liquids and gasses. The line that connects the center of the first base of the cylinder to the center of the second base of the cylinder is referred to as the axis of the cylinder or the centerline of the pipe. When two pipes share the same centerline they are said to be aligned.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A pipe thread protector comprising:
an interior thread protector and an exterior thread protector;
wherein the interior thread protector is adapted for use with pipes that have interior screw threads formed on them;
wherein the exterior thread protector is adapted for use with pipes that have exterior screw threads formed on them;
wherein the interior thread protector is adapted to protect an interior screw thread formed on the end of a pipe;
wherein the exterior thread protector is adapted to protect an exterior screw thread formed on the end of a pipe;
wherein the interior thread protector further comprises a first end cap, a plug, a first plurality of cantilever springs, and a first pull notch;
wherein the interior thread protector is further defined with a first end and a second end;
wherein the first end cap is a solid disk that is located at the first end of the interior thread protector;
wherein the outer diameter of the first end cap is the same diameter as the outer diameter of the pipe;
wherein the first end cap has formed in it the first pull notch;
wherein the plug is attached to the end of the first end cap that is distal from the first end of the interior thread protector;
wherein the plug is a cylindrical structure that further comprises a first hollow interior;
wherein the outer diameter of the plug is sized to fit within the inner diameter of the pipe;
wherein each of the first plurality of cantilever springs is a bar that is attached to the surface of the first hollow interior of the plug and that projects away from the first end of the interior thread protector parallel to the center axis of the plug;
wherein each spring selected from the first plurality of cantilever springs further comprises a spring lever and a spring foot;
wherein the exterior thread protector further comprises a second end cap, a barrel, a second plurality of cantilever springs, and a second pull notch;
wherein the exterior thread protector is further defined with a third end and a fourth end;
wherein the second end cap is a solid disk that is located at the third end of the exterior thread protector;
wherein the second end cap has formed in it the second pull notch;
wherein the barrel is attached to the end of the second end cap that is distal from the third end of the exterior thread protector;
wherein the barrel is a cylindrical structure that further comprises a second hollow interior;
wherein inner diameter of the barrel is sized to fit over the outer diameter of the pipe;
wherein each of the second plurality of cantilever springs is a bar that is attached to the surface of the second hollow interior of the plug and that projects away from the third end of the exterior thread protector parallel to the center axis of the barrel.

2. The pipe thread protector according to claim 1 wherein each spring selected from the second plurality of cantilever springs further comprises a spring lever and a spring foot.

3. A pipe thread protector comprising:
an exterior thread protector;
wherein the exterior thread protector is adapted for use with pipes that have interior screw threads formed on them;
wherein the exterior thread protector is adapted for use with pipes that have exterior screw threads formed on them;
wherein the exterior thread protector is adapted to protect an interior screw thread formed on the end of a pipe;
wherein the exterior thread protector is adapted to protect an exterior screw thread formed on the end of a pipe;
wherein the exterior thread protector further comprises a first end cap, a barrel, a first plurality of cantilever springs, and a first pull notch;
wherein the exterior thread protector is further defined with a first end and a second end;
wherein the first end cap is a solid disk that is located at the first end of the exterior thread protector;
wherein the first end cap has formed in it the first pull notch;
wherein the barrel is attached to the end of the first end cap that is distal from the first end of the exterior thread protector;
wherein the barrel is a cylindrical structure that further comprises a first hollow interior;
wherein inner diameter of the barrel is sized to fit over the outer diameter of the pipe;
wherein each of the first plurality of cantilever springs is a bar that is attached to the surface of the first hollow interior of the plug and that projects away from the first end of the exterior thread protector parallel to the center axis of the barrel;
wherein each spring selected from the first plurality of cantilever springs further comprises a spring lever and a spring foot.

* * * * *